US007366584B2

(12) United States Patent
Brodin et al.

(10) Patent No.: US 7,366,584 B2
(45) Date of Patent: Apr. 29, 2008

(54) POWER TOOL SYSTEM INCLUDING A MULTI-CORE CABLE WITH AN ELECTRONIC MEMORY MODULE

(75) Inventors: Hans Karl Johan Brodin, Enebyberg (SE); Gunnar Christer Hansson, Stockholm (SE); Carl Johan Erik Wallgren, Stockholm (SE)

(73) Assignee: Atlas Copco Tools AB, Nacka (SE)

( * ) Notice: Subject to any disclaimer, the term of this patent is extended or adjusted under 35 U.S.C. 154(b) by 0 days.

(21) Appl. No.: 10/548,497

(22) PCT Filed: Mar. 9, 2004

(86) PCT No.: PCT/SE2004/000330

§ 371 (c)(1), (2), (4) Date: Sep. 12, 2005

(87) PCT Pub. No.: WO2004/081881

PCT Pub. Date: Sep. 23, 2004

(65) Prior Publication Data

US 2006/0287757 A1 Dec. 21, 2006

(30) Foreign Application Priority Data

Mar. 10, 2003 (SE) .................................... 0300643

(51) Int. Cl.
*G06F 19/00* (2006.01)

(52) U.S. Cl. ...................................................... 700/168

(58) Field of Classification Search ................ 700/168, 700/225

See application file for complete search history.

(56) References Cited

U.S. PATENT DOCUMENTS 4,164,701 A * 8/1979 Gulledge et al. ........... 324/508
5,666,453 A * 9/1997 Dannenmann .............. 385/101
5,903,462 A 5/1999 Wagner et al.
6,054,846 A * 4/2000 Castleman .................. 323/283
6,390,205 B2 * 5/2002 Wallgren et al. ............... 173/2
6,654,840 B1 * 11/2003 Gendo et al. ............... 710/300
6,791,454 B2 * 9/2004 Mangold et al. ....... 340/870.16

(Continued)

FOREIGN PATENT DOCUMENTS

DE 10156218 A1 6/2003

(Continued)

*Primary Examiner*—M. N. Von Buhr
(74) *Attorney, Agent, or Firm*—Frishauf, Holtz, Goodman & Chick, P.C.

(57) ABSTRACT

A power tool system includes a portable power tool (10), a stationary control unit (11), and a cable assembly (12), which includes a multi-core cable 15 and connection pieces (13, 14), for communicating power and/or signals between the power tool (10) and the control unit (11). The cable assembly (12) is provided with an electronic memory module in the form a data chip (16) for storing data relating to the identity and operation characteristics of the cable assembly (12) as well as data concerning the compatibility of the power tool (10), the control unit (11) and the cable assembly (12). The data chip is arranged to register and accumulate the number power tool operations performed via the cable assembly (12) and to indicate when a predetermined limit for power tool operations as regards mechanical wear of the cable assembly (12) is reached.

4 Claims, 1 Drawing Sheet

U.S. PATENT DOCUMENTS

| | | | | |
|---|---|---|---|---|
| 6,821,157 | B2 * | 11/2004 | Brandstrom et al. | 439/638 |
| 6,875,059 | B2 * | 4/2005 | Sivertsen | 439/638 |
| 6,988,053 | B2 * | 1/2006 | Namaky | 702/183 |
| 7,039,821 | B1 * | 5/2006 | Potega | 713/340 |
| 7,049,937 | B1 * | 5/2006 | Zweig et al. | 340/310.11 |
| 7,069,345 | B2 * | 6/2006 | Shteyn | 709/250 |
| 2002/0166890 | A1 * | 11/2002 | Hsuan et al. | 235/375 |

FOREIGN PATENT DOCUMENTS

EP 1136188 A2 9/2001

* cited by examiner

POWER TOOL SYSTEM INCLUDING A MULTI-CORE CABLE WITH AN ELECTRONIC MEMORY MODULE

This application is a U.S. National Phase Application under 35 USC 371 of International Application PCT/SE2004/000330 filed Mar. 9, 2004.

FIELD OF THE INVENTION

The invention relates to a power tool system including a portable power tool, a stationary control unit and a cable assembly which includes connection pieces and a multi-core cable for interconnecting the power tool and the control unit thereby communicating power to the power tool and/or signals between the control unit and the power tool.

BACKGROUND OF THE INVENTION

In power tool systems of the above type there is a necessity that the components of the system, i.e. the power tool, the control unit, and the cable assembly, are compatible with each other to form a system that works accurately and safely. A key component is the multi-core cable, which apart from the risk that a cable assembly of an incorrect type or size has been chosen in the first place, is exposed to mechanical wear during use of the power tool and, therefore, has a limited service life.

Accordingly, there is a need for data informing means by which the identity and operational characteristics of the cable assembly are obtainable. A way to get an automatic check as to whether the components of the power tool system are of the correct type and size for the intended tool application is also very much needed. For instance, it is important that the cable assembly is of the correct type and is able to cope with the actual power load intended for powering the actual tool. It is also important that the cable assembly meets the safety requirements of various certifying bodies like U.L, Semko etc. Safety in such a system not only includes operational safety of the power tool system but also safety regarding distortions from and to other equipment. The personal safety of the operator also, of course, has high priority. Using a cable assembly of an incorrect type may cause serious accidents.

As mentioned above, cable assemblies including multi-core cables interconnecting portable power tools and stationary control units are exposed to a certain mechanical wear during use of the power tool, and such cable assemblies are not only expensive to replace but also are crucial for guaranteeing a safe and proper power tool operation. A breakdown of such a cable assembly may cause a dangerous situation for the operator. Also a cable assembly breakdown often means a costly stop in production, especially in assembly line operations.

Typical uses of power tool systems of the above-described type are screw joint tightening operations and grinding. Screw joint tightening with power tool systems of this type is very common in assembly lines in the motor vehicle industry.

SUMMARY OF THE INVENTION

The main object of the invention is to create a power tool system including a portable power tool, a stationary control unit and a cable assembly including connection pieces and a multi-core cable, wherein means are provided for providing data relating to the identification characteristics of the cable assembly.

A further object of the invention is to create a power tool system in which data are obtainable relating to the compatibility of the power tool, the control unit and the cable assembly.

A still further object of the invention is to provide a method and a power tool system by which cable assembly, including a multi-core cable, connected to a power tool may be safely used to an extent that the service life of the cable could be made use of to a high degree without risking a cable breakdown.

According to one aspect of the present invention, the above objects are achieved by providing a power tool system including a portable power tool, a stationary programmable control unit, and a cable assembly, including a multi-core cable, for interconnecting the power tool and the control unit for communicating power and/or signals between the power tool and the control unit, wherein the cable assembly includes an electronic memory module which is arranged to communicate with the control unit and/or the power tool and to store data relating to identification characteristics of the cable assembly.

Using a memory module provided to the cable assembly in this manner, the accumulated number of power tool operations performed may be registered and stored via the cable assembly to be compared with a predetermined acceptable number of tool operations for the actual power tool application.

DETAILED DESCRIPTION

Figure 1:
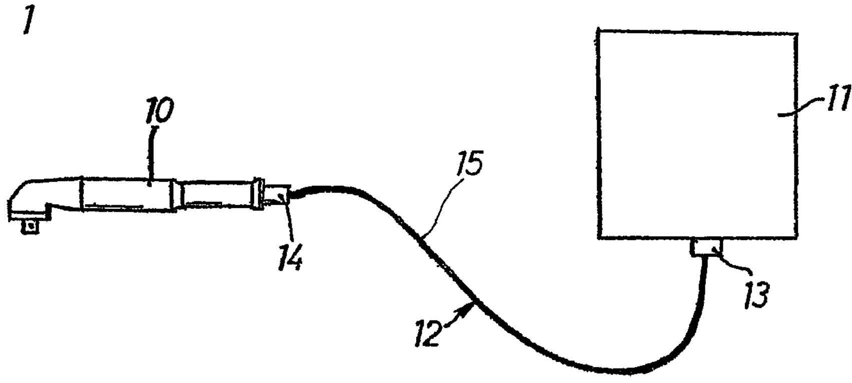
FIG. 1 shows a power tool system according to the present invention.
Figure 2:
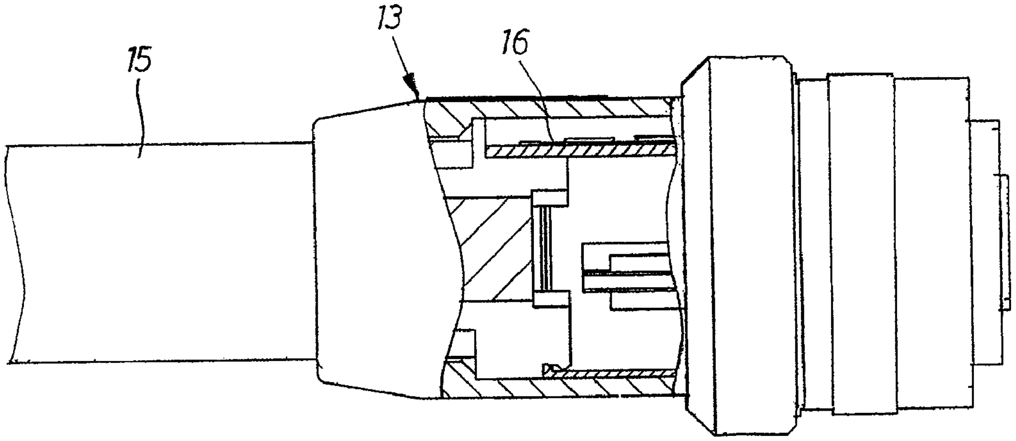
FIG. 2 is a top view of a connection piece with a memory module, shown partly in section.
Figure 3:
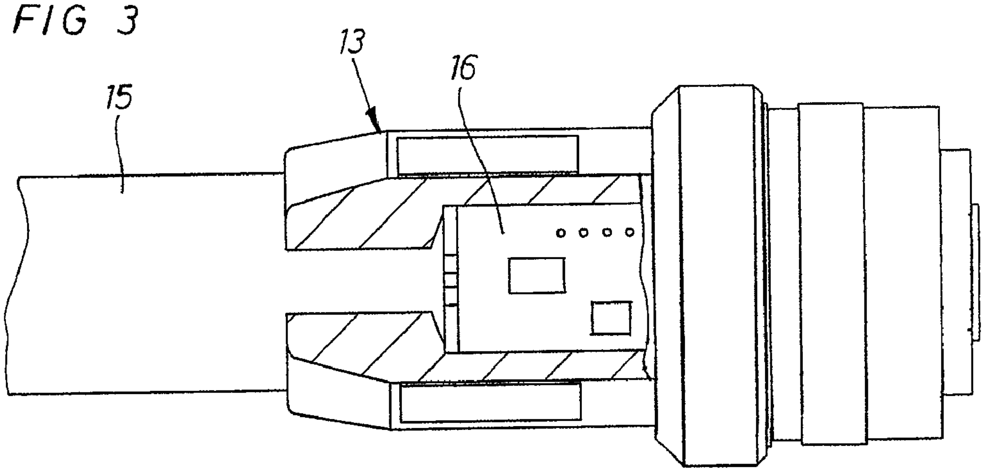
FIG. 3 is a side view of the view shown in FIG. 2.

As shown in FIG. 1, the power tool system according to the present invention includes a portable electric power tool 10 that is connected to a control unit 11 via a cable assembly 12. The power tool 10 is hand held for manual support in different operation positions, whereas the control unit 11 is secured to a stationary structure (not shown) in a vicinity of the power tool working site. The cable assembly 12 interconnects the power tool 10 and the control unit 11 and includes a multi-core cable 15 and two connection pieces 13 and 14. As shown in FIGS. 2 and 3, an electronic memory module in the form of a data chip 16 is provided in one of these connection pieces 13. The data chip 16 stores data informing of the compatibility of the cable with one or both of the power tool and the control unit, and the data chip 16 is arranged to store data relating to the accumulated number of tool operation cycles performed via the cable.

More specifically, the data chip may contain several pieces of data relating to the identity and functional characteristics of the cable assembly 12, including Model No., Series No., and manufacturing date, as well as special data provided by the users such as date of purchase, specific work site, service history, etc. In addition, the data chip 16 is intended to continuously accumulate the number of performed power tool operations (i.e., tool operation cycles) as well as a lapsed time, etc. The memory module is capable of indicating when the accumulated number of operation cycles equals the predetermined acceptable number of tool operation cycles for the actual power tool application. When, in the actual tool application, a predetermined number of tool operations is reached, or when an active period of time which is considered to be a safe limit from the mechanical wear point of view is reached, a warning signal is generated. Then, the cable assembly 12 should be exchanged for a new one. The used cable assembly 12 could be used further in another application in which mechanical wear is less intensive.

The cable assembly 12 includes a data communication line, for instance a data bus by which the chip 16 communicates with the power tool 10 and the control unit 11, and by this communication the chip 16 is able to communicate with and receive data from the power tool and/or the control unit. The data bus extends over the entire length of the cable assembly. In addition, the data stored in the data chip 16 may be read by the power tool 10 or the control unit 11, and in the system of the present invention means are provided to permit power tool operation when the data concerning the cable assembly, the control unit and the power tool are within predetermined limits.

The invention claimed is:

1. A power tool system comprising:

an electrically powered portable power tool;

a stationary programmable control unit; and a cable assembly interconnecting the power tool and the control unit for communicating electric power to the power tool and for communicating operation related signals between the power tool and the control unit;

wherein the cable assembly comprises:

a multi-core cable;

two connection pieces attached to opposite ends of the multi-core cable for connecting the cable assembly to the power tool and the control unit;

a memory module, which is provided in one of the two connection pieces, and which stores: (i) identification data of the cable assembly, (ii) an accumulated number of power tool operation cycles performed via the cable assembly and corresponding to mechanical wear of the cable assembly, and (iii) an acceptable number of tool operation cycles for a tool application, wherein the memory module indicates when the accumulated number of power tool operation cycles equals said acceptable number of tool operation cycles; and a data communication line, extending throughout a length of the cable assembly, for communicating data between the memory module and at least one of the power tool and the control unit.

2. The power tool according to claim 1, wherein the memory module comprises a data chip.

3. A cable assembly for interconnecting a portable power tool and a stationary control unit, said cable assembly comprising:

a multi-core cable;

two connection pieces attached to opposite ends of the multi-core cable for connecting the cable assembly to the power tool and the control unit;

a memory module, which is provided in one of the two connection pieces, and which stores: (i) identification data of the cable assembly, (ii) an accumulated number of power tool operation cycles performed via the cable assembly and corresponding to mechanical wear of the cable assembly, and (iii) an acceptable number of tool operation cycles for a tool application, wherein the memory module indicates when the accumulated number of power tool operation cycles equals said acceptable number of tool operation cycles; and a data communication line, extending throughout a length of the cable assembly, for communicating data between the memory module and at least one of the power tool and the control unit.

4. The cable assembly according to claim 3, wherein the memory module comprises a data chip.

* * * * *